(12) United States Patent
Armorikar et al.

(10) Patent No.: US 12,339,830 B2
(45) Date of Patent: Jun. 24, 2025

(54) SYSTEM AND METHOD FOR MANAGING SENSOR DATA ASSOCIATED WITH AN IOT ENVIRONMENT

(71) Applicant: Siemens Aktiengesellschaft, Munich (DE)

(72) Inventors: Rohit Armorikar, Maharashtra (IN); Tushar Bholane, Maharashtra (IN); Ayan Bose, Maharashtra (IN); Pushkar Nichkawade, Maharashtra (IN); Alpa Sarupria, Maharashtra (IN); Praveen Singh, Maharashtra (IN); Dharmendra Supeda, Maharashtra (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/282,111

(22) PCT Filed: Mar. 11, 2022

(86) PCT No.: PCT/EP2022/056336
§ 371 (c)(1),
(2) Date: Sep. 14, 2023

(87) PCT Pub. No.: WO2022/194703
PCT Pub. Date: Sep. 22, 2022

(65) Prior Publication Data
US 2024/0160621 A1    May 16, 2024

(30) Foreign Application Priority Data
Mar. 15, 2021 (IN) .............................. 202131010912

(51) Int. Cl.
*G06F 16/00* (2019.01)
*G06F 16/23* (2019.01)
*G06F 16/25* (2019.01)

(52) U.S. Cl.
CPC ........ *G06F 16/2365* (2019.01); *G06F 16/258* (2019.01)

(58) Field of Classification Search
CPC .......................... G06F 16/2365; G06F 16/258
(Continued)

(56) References Cited

U.S. PATENT DOCUMENTS 10,007,690 B2  6/2018  Finkler
10,552,246 B1  2/2020  Kirmer et al.
(Continued)

OTHER PUBLICATIONS

International Search Report and Written Opinion cited in corresponding PCT application No. PCT/EP2022/056336; Jul. 4, 2022; 15 pp.

*Primary Examiner* — Michelle N Owyang
(74) *Attorney, Agent, or Firm* — Lempia Summerfield Katz LLC

(57) ABSTRACT

A system and method for managing sensor data associated with an Internet-of-Things (IoT) environment is disclosed herein. The method includes receiving, by a processing unit, sensor data from at least one sensing unit in the IoT environment. The sensor data includes at least one sensor reading and a reading timestamp associated with the sensor reading. The method further includes determining whether a conflict exists based on the reading timestamp, wherein the conflict is associated with the sensor data overwriting an existing record in a database. The database is configured for storing the sensor data associated with the at least one sensing unit in time-series format. If the conflict exists, the method further includes merging the sensor data to the record based on an ingestion timestamp associated with the sensor data. Otherwise, a new record is created.

13 Claims, 3 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 11,892,988 B1* | 2/2024 | Wu ........................ | G06F 11/323 |
| 11,983,222 B2* | 5/2024 | Raghavendra ...... | G06F 16/2379 |
| 2011/0258160 A1* | 10/2011 | Lee ...................... | H04L 67/1095 |
| | | | 707/626 |
| 2017/0242935 A1 | 8/2017 | Wragg et al. | |
| 2018/0357556 A1 | 12/2018 | Rai et al. | |
| 2019/0227880 A1* | 7/2019 | Tkaczyk-Walczak ........................ | |
| | | | G06F 16/178 |
| 2020/0167355 A1 | 5/2020 | Rath et al. | |
| 2020/0265494 A1* | 8/2020 | Glaser .................... | G06V 20/20 |

\* cited by examiner

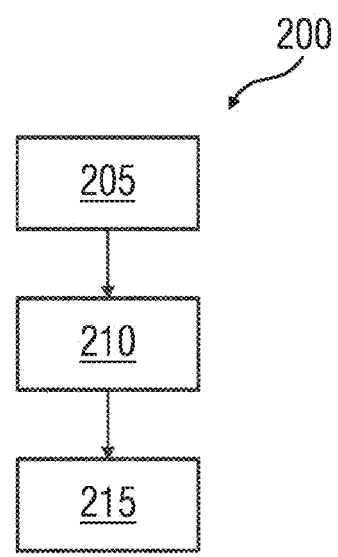

SYSTEM AND METHOD FOR MANAGING SENSOR DATA ASSOCIATED WITH AN IOT ENVIRONMENT

CROSS REFERENCE TO RELATED APPLICATIONS

This present patent document is a § 371 nationalization of PCT Application Serial Number PCT/EP2022/056336, filed Mar. 11, 2022, designating the United States which is hereby incorporated in its entirety by reference. This patent document also claims the benefit of IN 202131010912 filed on Mar. 15, 2021, which is hereby incorporated in its entirety by reference.

FIELD

Embodiments relate to managing sensor data and a system and method for managing sensor data associated with an Internet-of-Things environment.

BACKGROUND

Typically, an Internet-of-Things (IoT) environment includes geographically and often functionally separated sources of data. The sources may include, for example, sensors, equipment, controllers, and edge devices. The sensors measure or detect various parameters associated with the IoT environment and may generate outputs in the form of time-series data. Further, the time-series data from each of the sensors may be ingested into a database or time-series data store through an application programming interface. The stored data may be further analyzed to draw critical insights with respect to a performance of the IoT environment. However, in case of latencies associated with ingestion of data corresponding to any instance of time, there exists a risk of overwriting older data stored in the database, thereby leading to loss of information. In addition, existing systems only allow appending of newer data to old data. This may lead to distortion of information pertaining to the time-series data.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

In light of the above, there is a need for managing sensor data from an IoT environment in a time-series data store or database without loss or distortion of information.

Embodiments provide a system and method for managing sensor data associated with an IoT environment.

Embodiments provide a computer-implemented method of managing sensor data associated with an Internet-of-Things (IoT) environment. The method includes receiving, by a processing unit, sensor data from at least one sensing unit in the IoT environment. The sensor data includes at least one sensor reading and a reading timestamp associated with the sensor reading. The method further includes determining whether a conflict exists based on the reading timestamp. The conflict is associated with the sensor data overwriting an existing record in a database. If the conflict exists, the method further includes merging the sensor data to the record based on an ingestion timestamp associated with the sensor data. If no conflict exists, the method further includes creating a new record for the sensor data in the database. Embodiments prevent overwriting of existing records by newer sensor data. As a result, loss of information is prevented.

The method may further include determining a latency associated with ingestion of the sensor data to the database based on the ingestion timestamp. The latency determined is used to eliminate stale sensor data from overwriting newer sensor data.

The method may further include analyzing the sensor data stored in the database. The method may further include determining an anomaly associated with the IoT environment based on analysis of the sensor data.

The method may further include generating a notification, on an output device, based on analysis of the sensor data in the database. The notification may include, but not limited to, visual notifications and audio notifications.

Embodiments provide efficient management of sensor data through merging of sensor data for a given reading timestamp. Further, as the merging is performed based on the ingestion timestamp, order of the time-series data is maintained. As a result, loss or distortion of sensor data by overwriting or by overriding is eliminated. Therefore, analysis of the sensor data in the database provides more reliable insights compared to conventional time-series data stores.

Embodiments further provide an apparatus for managing sensor data in an IoT environment as disclosed herein. The apparatus includes one or more processing units and a memory unit communicatively coupled to the one or more processing units. The memory unit includes a data management module stored in the form of machine-readable instructions and executable by the one or more processing units, wherein the data management module is configured to manage sensor data associated with an IoT environment according to any of the methods described above.

The execution of the data management module may also be performed using co-processors such as Graphical Processing Unit (GPU), Field Programmable Gate Array (FPGA) or Neural Processing/Compute Engines. In addition, the memory unit may also include a database.

Embodiments further provide a system including one or more sensing units and an apparatus as described above, communicatively coupled to the one or more sensing units, for managing sensor data received from the one or more sensing units, according to the method described earlier.

Embodiments further provide a computer-readable medium, on which program code sections of a computer program are saved, the program code sections being loadable into and/or executable by a processor which performs the method as described above when the program code sections are executed.

The above-mentioned attributes, features, and advantages and the manner of achieving them, will become more apparent and understandable (clear) with the following description of embodiments in conjunction with the corresponding drawings. The illustrated embodiments are intended to illustrate, but not limit.

BRIEF DESCRIPTION OF THE FIGURES

FIG. 2 depicts a method for managing sensor data associated with an IoT environment, in accordance with an embodiment.

DETAILED DESCRIPTION

Figure 1A:
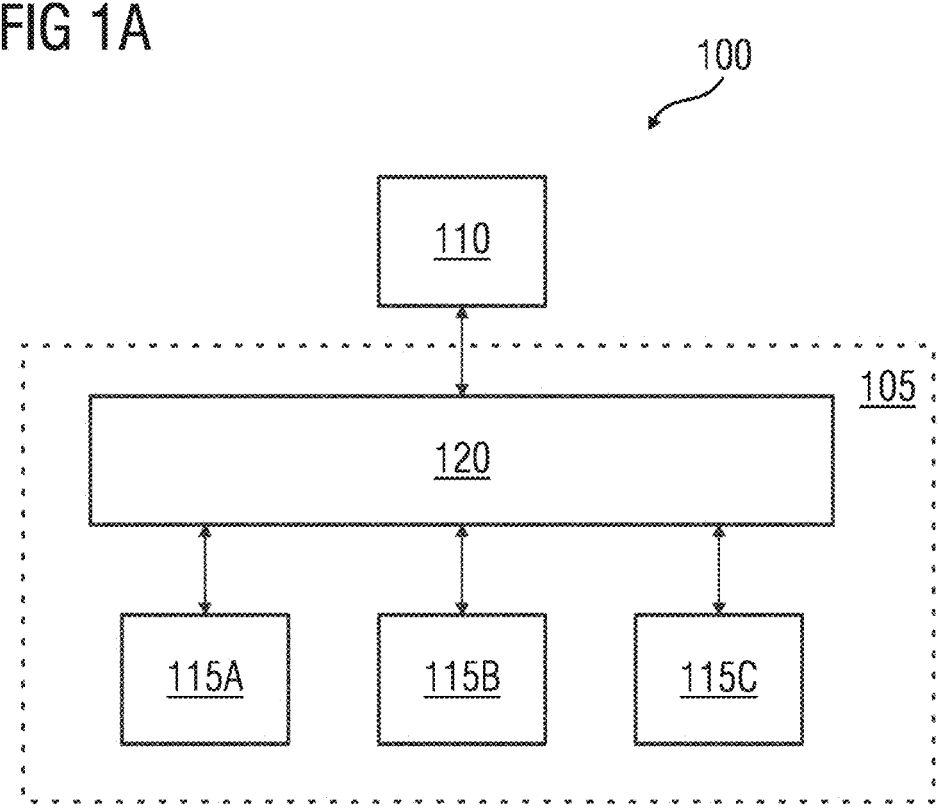
FIG. 1A depicts a system for managing sensor data associated with an IoT environment, in accordance with an embodiment.

Hereinafter, embodiments are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 depicts a system 100 for managing sensor data associated with an IoT environment 105, in accordance with an embodiment. The system 100 includes an apparatus 110 communicatively coupled to the IoT environment 105. In the present embodiment, the apparatus 110 is a cloud computing platform.

As used herein, "cloud computing" refers to a processing environment including configurable computing physical and logical resources, for example, networks, servers, storage, applications, services, etc., and data distributed over the network, for example, the internet. The cloud computing platform may be implemented as a service for managing sensor data associated with an IoT environment 105. In other words, the cloud computing system provides on-demand network access to a shared pool of the configurable computing physical and logical resources. The network is, for example, a wired network, a wireless network, a communication network, or a network formed from any combination of these networks.

The IoT environment 105 includes a plurality of sensing units 115A, 115B, 115C and 115D, collectively referred herein as sensing units 115. The sensing units 115 are communicatively coupled to an edge device 120. The edge device 120 is configured to perform edge computing operations on data received from the sensing units 115, and also enables the IoT environment 105 to communicate with the apparatus 110.

The plurality of sensing units 115 are configured to detect or measure parameters associated with the IoT environment 105. The sensor data, that is output from the plurality of sensing units 115, includes values of at least one parameter that indicates a state of the IoT environment 105. Non-limiting examples of the parameters may include temperature, speed, vibrations, noise levels, pressure, flow and so on. It must be understood that the sensing units 115 may include both sensors and transducers, along with respective data transmitters. In an embodiment, the sensing units 115 are communicatively coupled to the network 117 over a controller 119. Non-limiting examples of sensors and transducers include temperature sensors, accelerometers, gyroscopes, acoustic transducers, flow meters and pressure transducers. The sensing units 115 generate an output, that is sensor data, corresponding to measured values of the parameter. The sensor data are in the form of time-series data. For example, the sensing unit measures value of the parameter over intervals of 1 second to generate time-series data corresponding to the parameter. It must be understood that the time-series data may correspond to continuous signals or discrete signals generated by the sensing units 115. The signals from the sensing units 115 are preprocessed by a signal processing circuit to generate the time-series data. For example, the signals generated by the sensing units 115 may be sampled at suitable intervals of time to generate the time-series data. Further, the sensor data in time-series format is provided to the apparatus 110 through an Input/Output Interface associated with the apparatus 110. In the present embodiment, the I/O interface is associated with an Application Programming Interface, that helps in ingesting the sensor data to a time-series store associated with the apparatus 110.

Figure 1B:
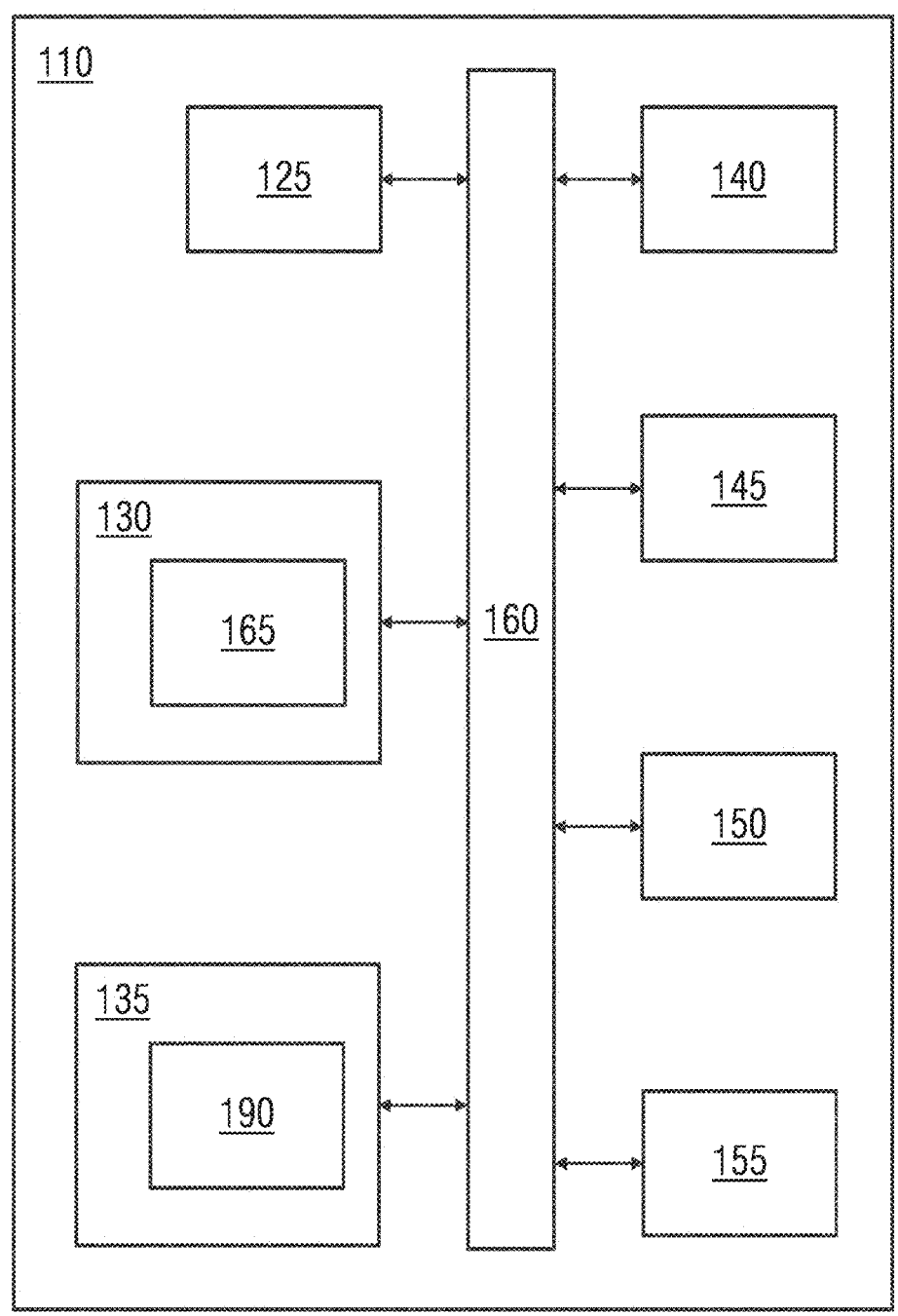
FIG. 1B depicts a system for managing sensor data associated with an IoT environment, in accordance with an embodiment.

The apparatus 110 is a cloud computing platform that includes a processing unit 125, a memory 130, a storage unit 135, a communication module 140, a network interface 145, an input unit 150, an output unit 155, a standard interface or bus 160 as shown in FIG. 1B. The apparatus 110 may be a (personal) computer, a workstation, a virtual machine running on host hardware, a microcontroller, or an integrated circuit. As an alternative, the apparatus 110 may be a real or a virtual group of computers (the technical term for a real group of computers is "cluster", the technical term for a virtual group of computers is "cloud"). The term 'processing unit', as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 125 may also include embedded controllers, such as generic or programmable logic devices or arrays, application specific integrated circuits, single-chip computers, and the like. In general, a processing unit 125 may include hardware elements and software elements. The processing unit 125 may be configured for multithreading, i.e., the processing unit 125 may host different calculation processes at the same time, executing the either in parallel or switching between active and passive calculation processes.

The memory 130 may include one or more of a volatile memory and a non-volatile memory. The memory 130 may be coupled for communication with the processing unit 125. The processing unit 125 may execute instructions and/or code stored in the memory 130. A variety of computer-readable storage media may be stored in and accessed from the memory 130. The memory 130 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The memory 130 includes a data management module 165 stored in the form of machine-readable instructions that are executable by the processing unit 125. These machine-readable instructions when executed by the processing unit 125 causes the processing unit 125 to manage sensor data associated with the IoT environment 105. The storage unit 135 includes a non-volatile memory which stores a database 190. The database 190 may store for example, historic data associated with the IoT environment 105, specifications associated with equipment in the IoT environment 105 and so on.

The input unit 150 may include input devices such as keypad, touch-sensitive display, camera, etc. capable of receiving input signal. The output unit 155 may include output devices such as monitors, speakers, etc. The bus 160 acts as interconnect between the processing unit 125, the memory 130, the storage unit 135, and the network interface 145.

The communication module 140 enables the apparatus 110 to receive sensor data from the edge device 120. In addition, the communication module 140 also enables the apparatus 110 to transmit notifications to an output device (not shown). The communication module 140 may support different standard communication protocols such as Transport Control Protocol/Internet Protocol (TCP/IP), Profinet, Profibus, and Internet Protocol Version (IPv).

The hardware depicted in FIG. 1B may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to the present disclosure.

According to an embodiment, the edge device 120 may also perform functions similar to the apparatus 110. As used herein "edge computing" refers to computing environment that is capable of being performed on the edge device 120, which may be a compact computing device that has a small form factor and resource constraints in terms of computing power. A network of edge devices may also be used to implement the apparatus 110. Such a network of edge computing devices is referred to as a fog network.

FIG. 2 depicts a method 200 of managing sensor data associated with an IoT environment, in accordance with an embodiment. The method is explained by taking an example of an IoT environment associated with an agricultural farm. For example, a plurality of sensors may be deployed in the farm for monitoring conditions such as humidity, soil nitrogen level, soil pH and so on. The sensor data from each of the sensors are transmitted to a cloud computing platform, similar to apparatus 110.

At step 205, sensor data is received from at least one sensing unit in the IoT environment. The sensor data includes at least one sensor reading and a reading timestamp associated with the sensor reading. The term 'sensor reading' as used herein refers to an output value generated by the sensing unit. For example, the output value may be analog or digital. In an example, the output value indicates measure of value of a parameter, e.g., pressure, measured by the sensing unit. In another example, the output value indicates presence or absence of a predefined condition, e.g., smoke, in the IoT environment. The term 'reading timestamp' as used herein, refers to a timestamp associated with an instant of time at which the sensing unit captures a parameter value. For example, the sensor data from a first sensing unit includes timeseries data for soil nitrogen level for reading timestamp "2020-10-25T18:02:30.123Z". Similarly, the sensor data from a second sensing unit includes sensor reading for soil humidity level for the same reading timestamp "2020-10-25T18:02:30.123Z".

At step 210, it is determined whether a conflict exists based on the reading timestamp. The conflict is associated with the sensor data overwriting an existing record in a database. The term 'record' as used herein refers to a data structure capable of storing data of different types. For example, the data structure may store sensor readings from one or more sensors and reading timestamps associated with the sensor reading. The database is configured for storing the sensor data associated with the at least one sensing unit in time-series format. In other words, the records are stored in the database to represent time-series data corresponding to the sensor data.

In the present embodiment, the records include the sensor reading, the reading timestamp and an ingestion time associated with the sensor data. The term 'ingestion timestamp' as used herein refers to a timestamp associated with an instant at which the sensor data is ingested to the database. It must be understood, the records may also store the ingestion timestamp in addition to the sensor reading and the reading timestamp. For example, the database may be searched using linear search to determine whether a record corresponding to the reading timestamp "2020-10-25T18:02:30.123Z" exists in the database. If yes, step 215 is performed. Otherwise, a new record corresponding to the reading timestamp "2020-10-25T18:02:30.123Z" is created.

At step 215, the sensor data is merged with the record based on an ingestion timestamp associated with the sensor data. The term 'merging' as used herein refers to adding the sensor data into an existing data structure within the record, in order to generate a new data structure including the sensor data as well as pre-existing data in the record. For example, if the ingestion timestamp associated with soil nitrogen level is "2020-10-25T18:02:30.456Z" and ingestion timestamp of the soil humidity level is "2020-10-25T18:02:30.789Z, then "2020-10-25T18:02:30.789Z" is later than "2020-10-25T18:02:30.456Z". In other words, the sensor data associated with soil humidity level is ingested into the database after sensor data associated with soil nitrogen level. Therefore, a record corresponding to the soil nitrogen level is created first at ingestion timestamp "2020-10-25T18:02:30.456Z". Further, the sensor data corresponding to the soil humidity level at "2020-10-25T18:02:30.789Z" is ingested into the record. In other words, the sensor data corresponding to the soil humidity level is appended to the record, thereby avoiding overwriting of data in the record.

In an embodiment, latency associated with sensor data may be determined based on the ingestion timestamp. For example, the latency may be determined as a difference or time interval between the reading timestamp and the ingestion time of the sensor data. For the same reading timestamp, if the latency corresponding to a first sensor data is, e.g., 10 microseconds and the latency corresponding to a second sensor data is 18 microseconds, then the second sensor data is determined to be older than the first sensor data. Otherwise, the first sensor is considered to be older than the second sensor data.

In the present embodiment, if ingestion timestamp associated with the existing data in the record is older than the ingestion timestamp associated with the latest sensor data at the same reading timestamp, the latest sensor data is added to the record. In other words, time-series data from a plurality of sensing units for the same reading timestamp are merged in order of the ingestion time associated with sensor data from each of the sensing units. In case the ingestion timestamp associated with the latest sensor data is older than the ingestion timestamp associated with sensor data in the database, the latest sensor data is discarded. As a result, ingestion of late arriving or stale sensor data into the database is avoided.

In an embodiment, the apparatus 110 analyses the sensor data in the database. The analysis may include, but not limited to, descriptive analysis, diagnostic analysis, predictive analysis and prescriptive analysis. In one example, the analysis may be diagnostic analysis to determine anomalies associated with the IoT environment. In an embodiment, the anomaly is detected based on deviations in the sensor data from a normal behavior. For example, if the sensor readings for any given parameter is higher than a predefined upper limit for the parameter, an anomaly may be detected. The anomaly may be associated with a malfunctioning of the sensing unit or an abnormal operating condition associated with the IoT environment. In another example, predictive analysis is performed by firstly generating a historical trend of the time-series data associated with one or more parameters stored across multiple records in the database. The predictive analysis is performed to predict a future state of the IoT environment 105.

In an embodiment, the apparatus 110 generates a notification on an output device based on the sensor data in the database. For example, a visual notification indicating a trend of the sensor data corresponding to the parameter may be generated. The visual notification may be in the form of a plot of sensor readings from a sensing unit in time domain. The plot is obtained by arranging the time-series data stored in across multiple records in the database, in the order of the reading timestamps. Similarly, multiple plots corresponding to each of the plurality of sensing units may be generated. In an implementation, plots from the sensing units may be superimposed to provide a comparative view of the plots. In another embodiment, an audio notification may be generated to notify an operator about anomalous operation of the IoT environment.

Although the embodiments have been explained with respect to sensor data in an IoT environment, it must be understood by a person skilled in the art that sequential data from a plurality of sources may also be managed in a similar fashion. The sources may include, but are not limited to, controllers, edge devices, electronic devices, appliances and so on. The sources may also generate other types of data, for example, operational data associated with equipment in the IoT environment, inputs provided by controllers to the equipment and so on.

Embodiments are not limited to a particular computer system platform, processing unit, operating system, or network. One or more aspects may be distributed among one or more computer systems, for example, servers configured to provide one or more services to one or more client computers, or to perform a complete task in a distributed system. For example, one or more aspects may be performed on a client-server system that includes components distributed among one or more server systems that perform multiple functions according to various embodiments. These components include, for example, executable, intermediate, or interpreted code, which communicate over a network using a communication protocol. Embodiments are not limited to be executable on any particular system or group of system, and are not limited to any particular distributed architecture, network, or communication protocol.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of managing sensor data in an internet of things (IoT) environment, the method comprising:
   receiving, by a processing unit, sensor data from at least one sensing unit in the IoT environment, wherein the sensor data comprises at least one sensor reading and a reading timestamp associated with the sensor reading;
   determining whether a conflict associated with the sensor data overwriting an existing record in a database exists based on the reading timestamp, wherein the record is configured for storing the sensor data associated with the at least one sensing unit in time-series format; and
   if the conflict exists, merging the sensor data to the record based on an ingestion timestamp associated with the sensor data; and
   if no conflict exists, creating a new record for the sensor data in the database.

2. The method of claim 1, wherein the record comprises at least one parameter value from at least one other sensing unit in the IoT environment and an ingestion timestamp associated with the record.

3. The method of claim 1, further comprising:
   determining a latency associated with ingestion of the sensor data to the database based on the ingestion timestamp.

4. The method of claim 1, further comprising:
   analyzing the sensor data stored in the database.

5. The method of claim 4, further comprising:
   determining an anomaly associated with the IoT environment based on analysis of the sensor data.

6. The method of claim 1, further comprising:
   generating a notification, on an output device, based on the sensor data in the database.

7. An apparatus for managing sensor data associated with an internet of things (IoT) environment, the apparatus comprising:
   one or more physical processing units; and
   a memory unit communicatively coupled to the one or more physical processing units, wherein the memory unit comprises a data management module stored in machine-readable instructions executable by the one or more physical processing units, wherein the data management module is configured to:
   receive sensor data from at least one sensing unit in the IoT environment, wherein the sensor data comprises at least one sensor reading and a reading timestamp associated with the sensor reading;
   determine whether a conflict associated with the sensor data overwriting an existing record in a database exists based on the reading timestamp—and wherein the record is configured for storing the sensor data associated with the at least one sensing unit in time-series format; and
   if the conflict exists, merging the sensor data to the record based on an ingestion timestamp associated with the sensor data; or
   if no conflict exists, creating a new record for the sensor data in the database.

8. A non-transitory computer-readable storage medium comprising instructions which, when executed by one or more processing units, cause the one or more processing units to:
   receive sensor data from at least one sensing unit in an internet of things (IoT) environment, wherein the sensor data comprises at least one sensor reading and a reading timestamp associated with the sensor reading;

determine whether a conflict associated with the sensor data overwriting an existing record in a database exists based on the reading timestamp—and wherein the record is configured for storing the sensor data associated with the at least one sensing unit in time-series format; and if the conflict exists, merging the sensor data to the record based on an ingestion timestamp associated with the sensor data; or if no conflict exists, creating a new record for the sensor data in the database.

9. The non-transitory computer-readable storage medium of claim 8, wherein the record comprises at least one parameter value from at least one other sensing unit in the IoT environment and an ingestion timestamp associated with the record.

10. The non-transitory computer-readable storage medium of claim 8, further comprising instruction that cause the one or more processing units to:

determine a latency associated with ingestion of the sensor data to the database based on the ingestion timestamp.

11. The non-transitory computer-readable storage medium of claim 8, further comprising instruction that cause the one or more processing units to:

analyze the sensor data stored in the database.

12. The non-transitory computer-readable storage medium of claim 11, further comprising instruction that cause the one or more processing units to:

determine an anomaly associated with the IoT environment based on analysis of the sensor data.

13. The non-transitory computer-readable storage medium of claim 8, further comprising instruction that cause the one or more processing units to:

generate a notification, on an output device, based on the sensor data in the database.

* * * * *